United States Patent [19]
Ryu

[11] Patent Number: 5,662,357
[45] Date of Patent: Sep. 2, 1997

[54] CAR HEIGHT CONTROL APPARATUS

[75] Inventor: Soo-Hyun Ryu, Seoul, Rep. of Korea

[73] Assignee: Daewoo Electronic Co., Ltd., Seoul, Rep. of Korea

[21] Appl. No.: 582,439

[22] Filed: Jan. 3, 1996

[30] Foreign Application Priority Data

Jun. 30, 1995 [KR] Rep. of Korea .................. 95018568

[51] Int. Cl.$^6$ .......................... B60S 9/00; B60G 11/26
[52] U.S. Cl. ........................................ 280/840; 280/711
[58] Field of Search .................................. 280/840, 711, 280/712, DIG. 1; 180/41

[56] References Cited

U.S. PATENT DOCUMENTS 2,874,956  2/1959  La Belle ........................... 280/DIG. 1
5,217,246  6/1993  Williams et al. ................. 280/DIG. 1

*Primary Examiner*—Kenneth R. Rice
*Attorney, Agent, or Firm*—Beveride, DeGrandi, Weilacher & Young LLP

[57] ABSTRACT

A car height control apparatus comprising: a weight sensing section for sensing a rear shaft force of a car; a bellows in which one end is fixed at the lengthwise frame, and the other end is adhered closely to a leaf spring that supports the lengthwise frame; an air tank for storing gas to be used in the bellows; and a control section for controlling the quantity of compressed air that inflows into the bellows by the weight sensing section signal. When unbalancing force is concentrated on rear shaft, load sensor generates the signal and transmits it to the controller. The controller that has received the signal opens the leveling valve to supply the compressed air toward the bellows. The bellows which is supplied with the compressed air increases its volume along the longitudinal direction, so the distance between lengthwise frame and leaf spring is greater. Finally, spring and shock absorber of suspension system recover and maintain the normal car height.

3 Claims, 2 Drawing Sheets

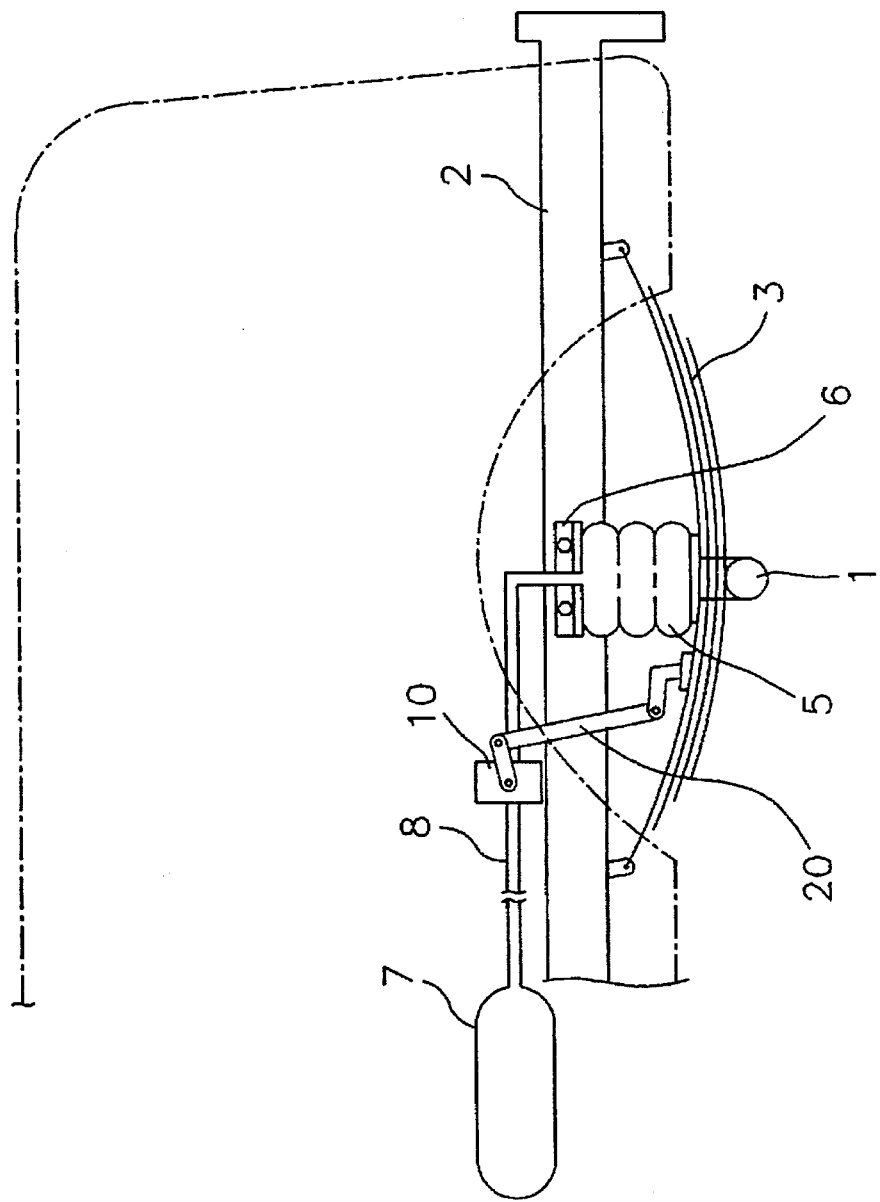

CAR HEIGHT CONTROL APPARATUS

BACKGROUND OF THE INVENTION

1. Field of the Invention

The present invention relates to a car height control apparatus. When a person or load occupies car, a load sensor senses the weight and then the controller raises car body height for occupant's comfortability and driving stability.

2. Description of the Prior Art

In a conventional car in which a rear wheel drive system is used, a suspension system is used within front shaft and rear shaft for isolating the vibration and shock caused by the road in order to provide a better feeling on board a car.

Generally, a car has an independent suspension system at its front shaft and an axle suspension system at its rear shaft, and these suspension systems are designed to mutually balance the weight of car and occupants or load. Similar automobile suspension system was disclosed in U.S. Pat. No. 4,927,169.

However, according to the car having the above suspension system, when occupant or load was concentrated on the rear part of car body, the load distribution between front shaft and rear shaft became unbalanced. Therefore the spring and shock absorber are in a state of compression and can not implement ordinary functions. Because of that, the front body of the car is raised up, and the rear body of the car is lowered down relatively, so there is greater air resistance during driving a car. Moreover, the front wheel contact state is bad at high speed because the front shaft is raised up. There are also some problems relating to reduced steering stability and an occupant's uncomfortability because a rear shaft suspension system does not operate originally.

SUMMARY OF THE INVENTION

The present invention has been made to overcome the above disadvantages. Therefore it is an object of the present invention to provide a car height control apparatus. When occupants or a load is concentrated on a rear car shaft, it can prevent the spring and shock absorber of rear shaft of a car suspension system from shrinking, so the rear body of the car is lowered and the front body is raised up.

To achieve the above object, a car height control apparatus comprises: a weight sensing section for sensing a part of a rear shaft force of a car; a bellows in which one end is fixed at the lengthwise frame, and the other end is adhered closely to a leaf spring that supports the lengthwise frame; an air tank for storing gas to be used in the bellows; and a control section for controlling the quantity of compressed air that inflows in the bellows by the weight sensing section signal.

Wherein the weight sensing section comprises a load sensor fixed between the bellows and the leaf spring, and the control section comprises a supply pipe for connecting the air tank and the bellows; a leveling valve for controlling the air flow in the supply pipe; and a controller to open or close the leveling valve.

In a car height control apparatus according to the present invention, when an unbalancing force is concentrated on the rear shaft, load sensor generates the signal and transmits it to the controller. The controller that has receive the signal opens the leveling valve to supply the compressed air toward the bellows. The bellows that has supplied the compressed air increases its volume along the longitudinal direction, so distance between lengthwise frame and leaf spring is greater. Finally, spring and shock absorber of rear shaft suspension system of the car recover so as to maintain the normal car height.

According to the car height control apparatus pursuant to the present invention, the bellows prevents the spring and shock absorber of rear car shaft suspension system from shrinking. In other words, it can prevent the height of the rear body of the car from going down and the front of the car body from raising, so it can reduce the air resistance and increase the front wheel contact force. Also, there are some merits that reduce the occupant's uncomfortability by improving his feeling, because the car height is controlled as normal weight distribution.

Also, according to a second embodiment of the invention, a car height control apparatus comprises: a bellows in which one end is fixed at lengthwise frame, and the other end is adhered closely to a leaf spring that supports the lengthwise frame; an air tank for storing gas to be used in the bellows; a leveling valve for controlling the air flow in a supply pipe; and a link in which one end is fixed at middle area of the leaf spring, and the other end is linked at the leveling valve of an on-off operation by the leaf spring displacement.

In a car height control apparatus according to the present invention, when unbalanced force is concentrate on rear shaft, the leaf spring is deformed along the direction of the force. The one end of link moves as much as the leaf spring displacement, and link movement is transmitted to the leveling valve.

Therefore, leveling valve opens the supply pipe between air tank and bellows, and supplies the compressed air to the bellows. The bellows which is supplied with the compressed air increases the volume along the longitudinal direction, so distance between lengthwise frame and leaf spring is greater. Finally, spring and shock absorber of rear shaft suspension system recover so as to maintain the normal car height.

According to the car height control apparatus the present invention, the bellows prevents the spring and shock absorber of rear shaft suspension system from shrinking. In other words, bellows can prevent the height of the rear body from going down and the front body from rising, so it can reduce the air resistance and increase the front wheel contact force. Also, there are some merits that reduce the occupant's uncomfortability by and improving his feeling, because the car height is controlled as normal weight distribution.

BRIEF DESCRIPTION OF THE DRAWINGS

The above object and other advantages of the present invention will become more apparent by describing in detail a preferred embodiment thereof with reference to the attached drawings in which:

FIG. 2 is a second embodiment showing a car height control apparatus of a present invention.

DESCRIPTION OF THE PREFERRED EMBODIMENT

Figure 1:
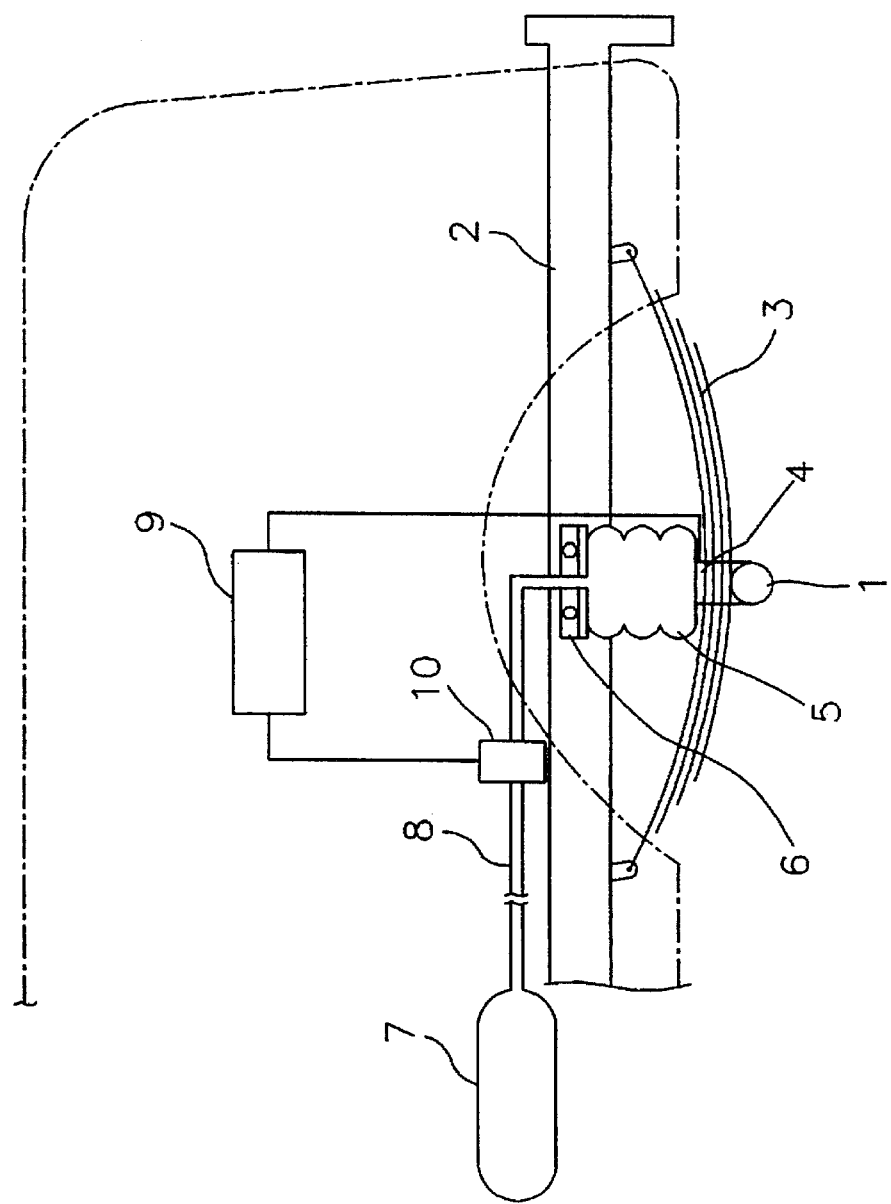
FIG. 1 is a first embodiment showing a car height control apparatus of the present invention.

FIG. 1 is a first embodiment showing a car height control apparatus of the present invention.

As shown in FIG. 1, a car height control apparatus consists of load sensor 4, bellows 5, air tank 7, and controller 9.

The car body is fixed at an upper part of lengthwise frame 2 which is connected to the front and rear of a car, and the leaf spring 3 is fixed at and supports lower part of lengthwise frame 2. A bellows 5 and a load sensor 4 are installed between the middle area of upper leaf spring 3 and lengthwise frame 2, and rear shaft 1 supports the middle area of bottom of leaf spring 3. The upper portion of bellows 5 is fixed at the side of lengthwise frame 2 by bracket, and the lower portion of bellows 5 is fixed at and pushes load sensor 4 to the leaf spring 3. Namely, load sensor 4 is inserted and fixed between the lower portion of bellows 5 and upper portion of leaf spring 3.

At a portion upper side in the bellows 5, the supply pipe 8 is connected to supply compressed air to the inside of bellows 5. The leveling valve which controls the compressed air flow is installed in the middle of supply pipe 8, and connected to controller 9 for being controlled by controller The controller 9 input is a load sensor 4 signal, and output is an on-off operation signal of leveling valve 10.

According to the car height control apparatus of the present invention, when an occupant or load is distributed normally to front shaft and rear shaft 1, the leveling valve 10 does not operate because the load sensor 4 signal of rear shaft is weak. Accordingly the compressed air is not supplied to bellows 5, so the bellows 5 does not expand. As a result, the rear shaft suspension system operates normally.

Meanwhile, if the occupant or load is concentrated in the rear part of a car, the leaf spring 3 is deformed linearly, so the compression force between lengthwise frame 2 and leaf spring 3 makes the load sensor 4 signal strong. The controller 9 senses the unbalance and operates the leveling valve 10 quantitatively, so the compressed air is supplied from air tank 7 to the inside of bellows 5 via supply pipe 8. The bellows 5 which supplies the compressed air increases its volume along the longitudinal direction, so the distance between lengthwise frame 2 and leaf spring 3 is greater. Finally, spring and shock absorber of suspension system recover to thus maintain the normal car height.

According to the car height control apparatus of the present invention, the bellows 5 prevents the spring and shock absorber of rear shaft suspension system from shrinking. In other words, it can prevent the rear body from going down and the front car body from rising, so it can reduce the air resistance and increase the front wheel contact force. Also, there are some merits that reduce the occupant's uncomfortability by improving his feeling because the car height is controlled as normal weight distribution.

FIG. 2 is a second embodiment showing a car height control apparatus of a present invention.

As shown in FIG. 2, a car height control apparatus consists of bellows 5, air tank 7, and link 20.

The car body is fixed at upper portion of lengthwise frame 2 which is connected to the front and rear of a car, and the leaf spring 3 is fixed at and supported at lower part 0f lengthwise frame 2. A bellows 5 and a load sensor 4 are installed between the middle area of upper leaf spring 3 and lengthwise frame 2, and rear shaft 1 supports the middle area at the bottom of leaf spring 3. The upper portion of bellows 5 is fixed at the outer side of lengthwise frame 2 by bracket, the lower portion of bellows 5 is fixed at the leaf spring 3.

At a portion of upper side in the bellows 5, the supply pipe 8 is connected to supply compressed air to the inside of bellows 5. The leveling valve which controls the compressed air flow is installed in the middle of supply pipe 8, and connected to link 20.

The one end of link 20 is fixed at leaf spring 3 near bellows 5, and the other end of link 20 is fixed at leveling valve 10.

According to the car height control apparatus of the second embodiment of the present invention, its operation is similar to the first embodiment of the present invention. The main point of difference is that in the second embodiment there is no controller 9 which operating the leveling valve 10, but there is a link 20 which uses deformation of leaf spring 3 directly.

That is, when the occupant or load is concentrated on rear part of car, the leaf spring 3 is deformed linearly, so one end of link 20 is moved as much as displacement between leaf spring 3 and lengthwise frame 2. A movement of one end of link 20 is transmitted to leveling valve 10 by hinge part of link 20, and then opens the leveling valve 10. An opened leveling valve 10 supplies compressed air to the inside of bellows 5. The bellows 5 which is supplied with the compressed air increases its volume along the longitudinal direction, so the distance between lengthwise frame 2 and leaf spring 3 is greater. Finally, spring and shock absorber of suspension system are recover and maintain the normal car height.

According to the car height control apparatus of the present invention, the bellows 5 prevents the spring and shock absorber of rear shaft suspension system from shrinking. In other words, it can prevent the rear body of the car from going down and the front body from rising, so it can reduce the air resistance and increase the front wheel contact force.

Also, there are some merits that reduce the occupant's uncomfortability by improving his feeling because the car height is controlled as normal weight distribution.

It should be understood that although preferred embodiments of the invention have been described in detail above, many modifications and variations could be effected therein by those who are skilled in the art without departing from the spirit and scope of the invention as defined by the appended claims.

What is claimed is:

1. A car height control apparatus comprising:
   a weight sensing section for sensing a part of a rear shaft force of a car;
   a bellows in which one end is fixed at a lengthwise frame, and other end is adhered closely to a leaf spring that supports the lengthwise frame;
   an air tank for storing gas to be used in the bellows; and
   a control section for controlling the quantity of compressed air that inflows into the bellows by the weight sensing section signal.

2. A car height control apparatus as claimed in claim 1, wherein the weight sensing section comprises a load sensor fixed between the bellows and the leaf spring.

3. A car height control apparatus as claimed claim 1, wherein the control section comprises:
   a supply pipe for connection of the air tank and the bellows;
   a leveling valve for controlling the air flow in the supply pipe; and
   a controller to open or close the leveling valve.

* * * * *